United States Patent
Volta et al.

(10) Patent No.: US 10,504,087 B2
(45) Date of Patent: Dec. 10, 2019

(54) SHOPPING CART MONITORING SYSTEM AND METHOD FOR STORE CHECKOUT

(71) Applicant: Datalogic IP Tech S.r.l., Lippo di Calderara di Reno (Bologna) (IT)

(72) Inventors: Romano Volta, Bologna (IT); Valentina Volta, Bologna (IT); Luigi Frison, Mirano (IT); Nicola Centenaro, Silea (IT); Paolo Mazzocato, Casier (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 348 days.

(21) Appl. No.: 15/270,270

(22) Filed: Sep. 20, 2016

(65) Prior Publication Data

US 2017/0083887 A1 Mar. 23, 2017

Related U.S. Application Data

(60) Provisional application No. 62/222,082, filed on Sep. 22, 2015.

(51) Int. Cl.
*G06Q 20/18* (2012.01)
*G06Q 20/20* (2012.01)
(Continued)

(52) U.S. Cl.
CPC .......... *G06Q 20/18* (2013.01); *G06Q 20/203* (2013.01); *G06Q 20/208* (2013.01);
(Continued)

(58) Field of Classification Search
None
See application file for complete search history.

(56) References Cited

U.S. PATENT DOCUMENTS

| 3,836,755 A | 9/1974 | Ehrat |
| 4,373,133 A | 2/1983 | Clyne et al. |

(Continued)

FOREIGN PATENT DOCUMENTS

| EP | 0 709 813 A1 | 5/1996 |
| EP | 0 986 035 A2 | 3/2000 |

(Continued)

OTHER PUBLICATIONS

Extended European Search Report dated Dec. 13, 2016 from Application No. EP 16189654.3 (9 pages) (claims priority to the present application).

(Continued)

*Primary Examiner* — Fateh M Obaid
(74) *Attorney, Agent, or Firm* — Stoel Rives LLP

(57) ABSTRACT

A system and method for retail inventory checkout in which the customer selects items from the item shelves and as an item is taken from the shelf, the customer employs an input device, such as a portable data terminal, a smart phone provided with a store application or other suitable device that communicates with the store network, to identify the item either by scanning the optical code on the item or by other means, and then once scanned, the item is added to the purchase list and then placed in a shopping cart, basket or other container. Once item selection is completed, the customer proceeds to a point of sale (POS) or pay station and puts the cart onto a weigh scale whereby the total weight of the cart with the items included (measured total weight) is measured by the weigh scale and the net weight of the items in the cart (calculated by subtracting the weight of the cart from the measured total weight) is compared to a theoretic weight of the items as calculated by the store system using the weight information of the items present in the store database. Based on the result of the comparison, the store (Continued)

system either approves the transaction, whereby the customer then pays for the transaction and is permitted to exit with the items, or the transaction is flagged for audit or further assistance/scrutiny.

19 Claims, 3 Drawing Sheets

(51) Int. Cl.
  *G06Q 30/06* (2012.01)
  *G07G 1/00* (2006.01)
(52) U.S. Cl.
  CPC ....... *G06Q 30/0635* (2013.01); *G07G 1/0054* (2013.01); *G07G 1/0081* (2013.01)

(56) References Cited

U.S. PATENT DOCUMENTS

| | | | | |
|---|---|---|---|---|
| 5,540,301 | A * | 7/1996 | Dumont | A47F 9/042 |
| | | | | 186/61 |
| 6,189,789 | B1 | 2/2001 | Levine et al. | |
| 6,382,357 | B1 * | 5/2002 | Morrison | G06Q 20/343 |
| | | | | 186/61 |
| 6,386,449 | B1 | 5/2002 | Signoretto | |
| 6,725,206 | B1 * | 4/2004 | Coveley | A47F 9/048 |
| | | | | 177/17 |
| 7,780,081 | B1 * | 8/2010 | Liang | G06Q 30/0633 |
| | | | | 235/383 |
| 8,915,429 | B2 | 12/2014 | Muniz | |
| 8,967,474 | B2 * | 3/2015 | Olmstead | G06K 7/10722 |
| | | | | 235/444 |
| 9,892,438 | B1 * | 2/2018 | Kundu | G06Q 30/0609 |
| 2003/0015585 | A1 * | 1/2003 | Wike, Jr. | G06Q 20/343 |
| | | | | 235/383 |
| 2007/0125848 | A1 | 6/2007 | Bannetto Piamenta | |
| 2009/0134221 | A1 * | 5/2009 | Zhu | G06K 7/10544 |
| | | | | 235/383 |
| 2014/0214596 | A1 | 7/2014 | Acker, Jr. et al. | |
| 2014/0338987 | A1 * | 11/2014 | Kobres | G01G 19/4144 |
| | | | | 177/1 |
| 2014/0351056 | A1 * | 11/2014 | Codato | G06F 11/0742 |
| | | | | 705/14.64 |
| 2015/0025969 | A1 * | 1/2015 | Schroll | G06Q 30/0633 |
| | | | | 705/14.53 |
| 2017/0103266 | A1 * | 4/2017 | Migdal | G07G 1/0054 |

FOREIGN PATENT DOCUMENTS

| | | |
|---|---|---|
| EP | 1162583 A1 | 12/2001 |
| EP | 1 873 705 A1 | 1/2008 |
| WO | WO 91/19961 | 12/1991 |
| WO | WO 01/93150 A1 | 12/2001 |
| WO | WO 2009/066161 A2 | 5/2009 |
| WO | WO 2012/168934 A1 | 12/2012 |
| WO | WO 2013/098749 A1 | 7/2013 |

OTHER PUBLICATIONS

"JOYA™ X2", 2014 Datalogic ADC, Inc., www.datalogic.com/upload/marketlit/datasheets/DS-JOYAX2-ENA4.pdf, visited Nov. 14, 2016.

"Self-Shopping Shopevolution for the Way We Shop Today", 2013 Datalogic ADC, Inc.

* cited by examiner

SHOPPING CART MONITORING SYSTEM AND METHOD FOR STORE CHECKOUT

RELATED APPLICATION DATA

This application claims priority under 35 U.S.C. § 119(e) to U.S. Provisional Application No. 62/222,082 filed on Sep. 22, 2015, hereby incorporated by reference.

BACKGROUND

The field of the present disclosure relates to systems and methods of monitoring items for store checkout or inventory management. In a preferred application, the present disclosure relates to a system for filling an order such as from a retail store and providing self-service checkout with adequate security.

Presently, the item identification, charge, payment, and checkout in most retail stores is "centralized," meaning that it is done centrally at a checkout stand. The store generally has a shelf and display area in which the items to be purchased are located. The customer enters this area through a turnstile or other entrance. The customer then selects the items to be purchased and takes them to the central checkout stand area where several checkout stands may be located. There, the items are handled by a store clerk who identifies the items and determines the price of each item and adds the prices to determine the cost to the customer. This task may be aided by the use of an electronic cash register and an optical code reader. The customer then pays for the items by a suitable payment method such as cash, check, or credit/debit card. The customer then leaves the store with the items, in some cases helped by the clerk. In this centralized checkout, the items must be physically handled several times. First, if a basket, cart or trolley is used, the items are removed from the shelf and placed in the cart. Second, the items are removed from the cart and placed on the checkout counter. Third, the checkout clerk moves the items across the counter and past an optical code reader. Fourth, the clerk may put the items in a bag or box, and sometimes the clerk sends the items down a ramp where a bagger bags the items then moves the item-filled bags back into the cart or hands the bags to the customer. This process is time-consuming for the store clerk and may result in a long wait for the customer, particularly during peak shopping periods.

One approach to improve the efficiency of the centralized process is to automate the central checkout process. This approach is described in U.S. Pat. No. 4,676,343 and uses a scanner in front of an item tunnel. The customer scans each item and places it on the conveyor belt, which carries the item through the tunnel where its identity is confirmed by its weight and size. In U.S. Pat. No. 8,967,474, the items are taken to the checkout counter and placed on a conveyor belt which moves the items through a tunnel scanner where the items are scanned. However, neither of these approaches eliminate all the drawbacks of a "centralized" system.

In general, a decentralized checkout may offer benefits over the centralized checkout by reducing the customer steps required for checkout. Several systems of decentralized checkout have been devised. One system for automated checkout is described in U.S. Pat. No. 3,836,755 whereby a scanner in the cart is used to read the items removed from the shelf and placed in the cart. To confirm the presence of the items in the cart, a scale in the cart measures the increase in the weight of the cart. The weighing is further used to eliminate fraud by monitoring the addition and subtraction of the weight in the cart. Another cart-mounted scanner is described in U.S. Pat. No. 4,373,133 where a shopping cart is provided with a laser scanner wand, whereby the customer selects an item from the shelf, scans the item selected and places the scanned item in the cart. Once item selection/collection has been completed, the customer proceeds to a sales terminal where bag(s) containing the items are placed on a weighing machine and if the measured weight corresponds to the aggregate weight, the transaction is approved and an aggregate price for the items is indicated to the customer. Nonetheless, these systems have limitations as to preventing fraud and may be cumbersome to the user.

DETAILED DESCRIPTION OF THE EMBODIMENTS

Embodiments described are directed to systems for and methods of identifying items selected, such as items being selected by a customer (e.g., retail customer, a worker filling an order from inventory, or other user). Although the language of this description particularly describes a retail shopping application, other tasks of filling and recording an order from inventory are readily applicable and thus included.

Figure 1:
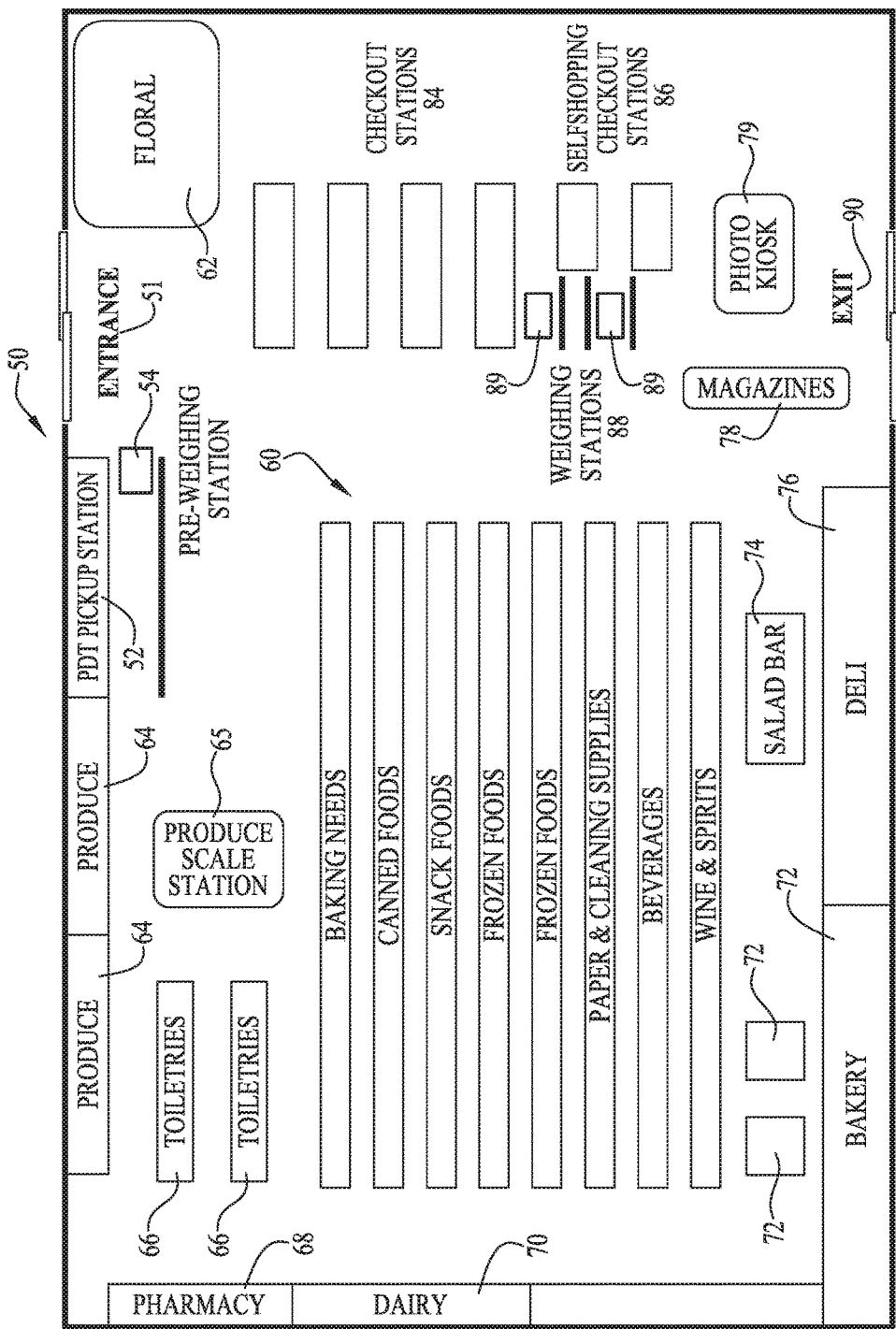
FIG. 1 is a diagrammatic view of a retail shopping store layout according to an embodiment.
Figure 2:
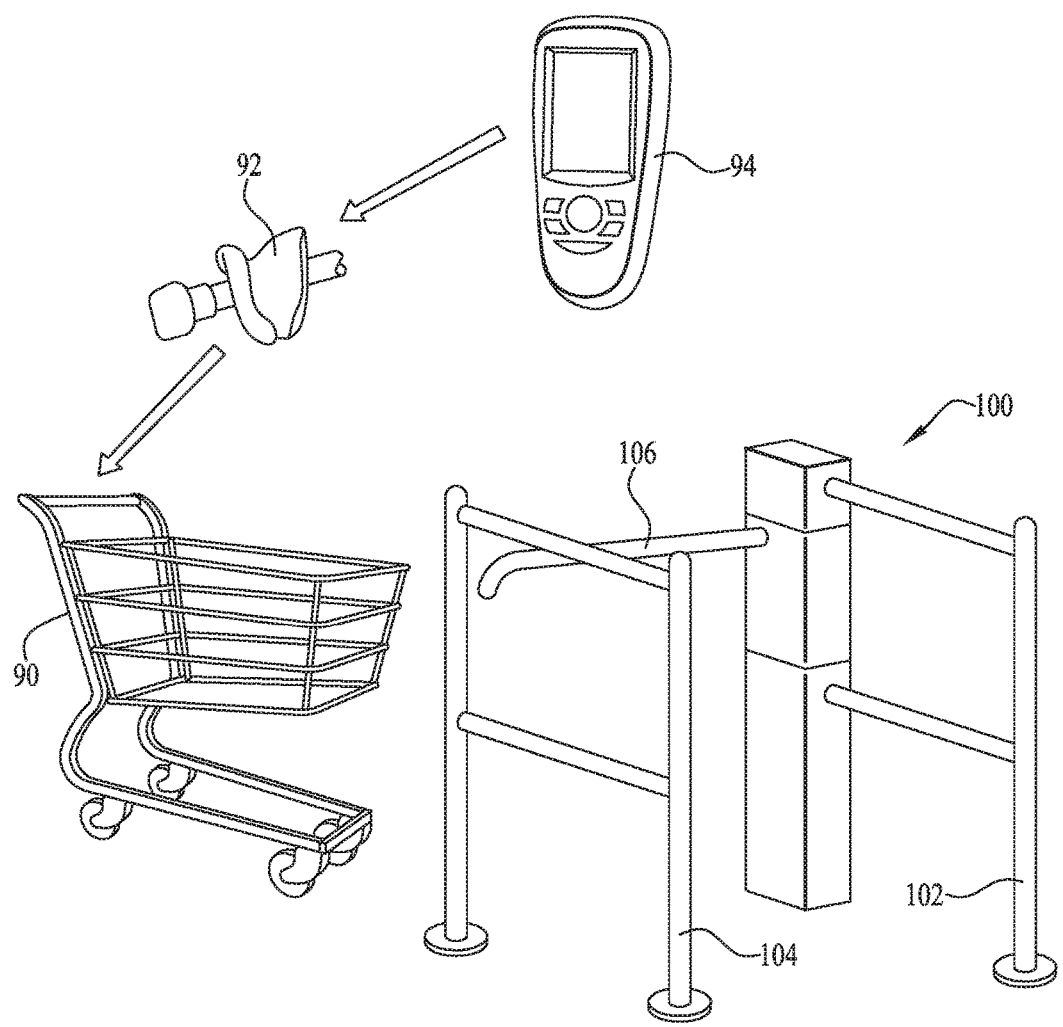
FIG. 2 is a diagrammatic view of an example store gate section and shopping cart.

One embodiment is a self-service decentralized checkout system. FIG. 1 illustrates a retail shopping store layout 50 such as a grocery store. The store may include shelving areas 60 presenting various goods for selection, as well as specialty areas such as floral 62, produce 64, toiletries 66, pharmacy 68, dairy 70, bakery 72, salad bar 74, deli 76, magazine or greeting cards 78, or specialty kiosk (e.g., photo) 79. Upon entering the store or merchandise area, such as via entrance 51, the customer uses an input device (such as a portable data terminal supplied by the store, a smart phone provided with a store application, or other suitable device) that communicates with the store network. Also upon entering the store, the customer takes a cart, such as the cart 90 illustrated in FIG. 2, (or alternately a basket, trolley, or other container) and then proceeds around the store, selecting items from the shelves or any of the specialty areas. As an item is taken from the shelf, the customer employs the input device, such as the input device 94 shown in FIG. 2 from the PDT pickup station 52, to identify the item either by scanning the optical code on the item or by other means, and then once scanned, the item is added to the purchase list and then placed in the cart 90.

Once the customer has finished selecting items, the customer proceeds to a point of sale (POS) or pay station and parks the cart onto a weigh scale, such as the weighing stations 88, whereby the total weight of the cart with the items included (measured total weight) is measured by the weigh scale and the net weight of the items in the cart (calculated by subtracting the tare (empty) weight of the cart from the measured total weight) is compared to a theoretical weight of the items as calculated by the store system using the weight information of the items present in the store database. Based on the result of the comparison, the store system either approves the transaction, whereby the customer then pays for the transaction at the selfshopping checkout stations 86, and is permitted to exit through exit 90 with the items, or the transaction is flagged for audit or further assistance/scrutiny. The store 50 may also have conventional checkout stations 84 which may operate in combination with the input device and cart weighing system or separately.

Figure 3:
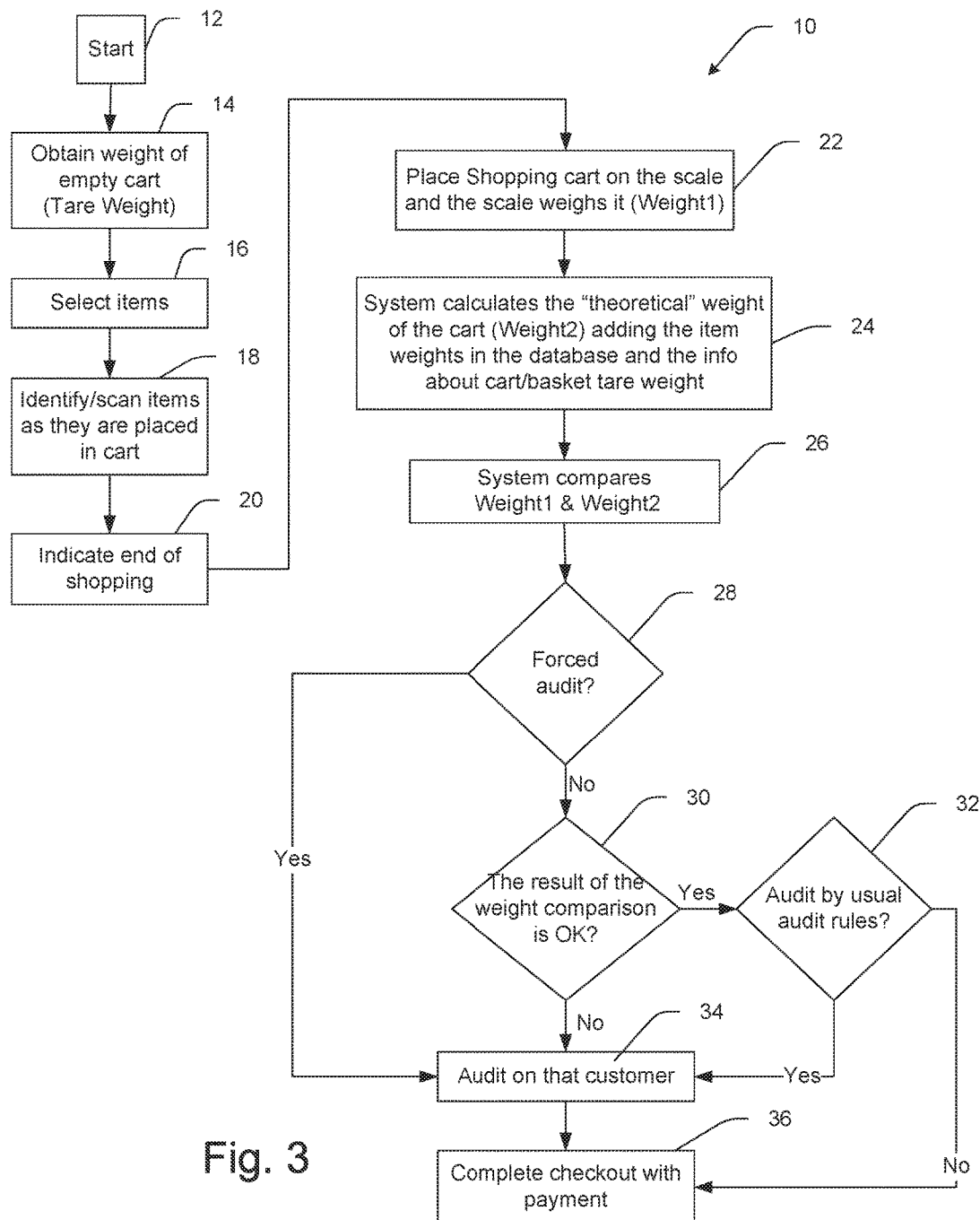
FIG. 3 is a flow chart of a method for checkout according to an embodiment.

FIG. 3 illustrates an example process 10 for decentralized checkout comprising the steps as follows.

Step 12: Start.

Step 14: Obtaining the tare weight of the empty shopping cart, basket, or personal shopping bag. One way of obtaining the tare weight may be by actually weighing the cart 90, whereby the customer places the empty shopping cart on a weigh scale at pre-weighing station 54 (see FIG. 1), the scale measuring the actual tare weight of that particular cart for that transaction. Alternatively, the store computer may contain and manage a database of the weight and tolerance of each type of shopping cart or basket stored in the software database. In another alternative, each single cart/basket can be weighed and stored in the database. When the shopping cart/basket is weighed, the cart/basket, or the cart/basket type, may be identified by reading a code on the cart (e.g., an optical or RFID code) or using imaging identification technologies, and the weight can be retrieved from the database that stores the weights of the carts at the store. Weighing each cart and storing individual cart tare weight in the database may resolve variations in cart weight as between carts of the same model. Weighing each cart prior to loading may provide an accurate tare weight, thereby resolving variation in cart weight as between carts of the same model, reflecting changes in cart weight over time such as if a repaired cart was fitted with new parts of different weights, or allowing for the customer to include personal shopping bags in the cart that may be loaded during the item selection process. This step may occur at any suitable time/sequence during the process. For example, upon checkout, the customer may be prompted to read an optical code on the cart for identification upon which the tare weight for that cart is obtained. Alternatively, the cart may be identified during the checkout weighing process (Step 22) by a data reader located proximate the weigh scale (at weighing stations 88). In another alternative, the customer may be prompted on the portable data terminal or a separate checkout display, to select the type of container/cart that has been selected for use in the transaction.

Step 16: The customer proceeds around the store and selects items to be purchased.

Step 18: Identifying/scanning the items as they are placed in the cart using a portable data terminal supplied by the store, a smart phone provided with a store application, or other suitable input device. One preferred system is the Joya X2 device 94 as in FIG. 2, made by Datalogic S.p.A. of Bologna Italy. The Joya X2 device 94 is a handheld shopping device equipped with an optical code reader capable of reading the optical codes on items selected by the customer. The shopping cart 90 may advantageously include a stand or holder 92 which supports/holds the handheld shopping device 94 thereby freeing the customer from having to hold the device while maneuvering the cart about the store aisles or while selecting items from the store shelves.

Step 20: When the customer has completed selecting items, the customer proceeds to the checkout or exit area, and may provide an indication of the "end of shopping." One method of indicating the end of shopping is by using the portable data terminal to read an "end of shopping" optical code, whereby the shopping list is sent to the store computer for checkout.

Step 22: Weighing the cart with the items included (Weight1). A scale 89 is provided at the checkout area, and the customer may place the cart 90 on the scale 89 for weighing the cart. The scale 89 may be in a suitable location such as at weighing stations 88 in proximity to the POS cashier (of checkout stations 84) or self-checkout stations 86.

The store system may provide signage, audio, or audio-visual messaging for instructing the customer on the checkout process, which may include instruction to remove all the "non-items" from the cart (e.g., personal bags, purses, umbrella, coat, babies). Such an instruction may be sent to the customer just before starting the weighing. The message may be displayed in a suitable location such as: on the portable data terminal; on a display screen mounted on the cart; or at some other prominent/suitable location proximate the weigh scale 89. A store clerk may be stationed in the vicinity to monitor customer activity and as needed remind the customer to remove all "non-items" from the cart, thus avoiding unnecessary checkout delays.

The checkout weigh station 88 may include a frame or gate 100 (see FIG. 2) which may include a turnstile 106, e.g., mechanical or electronic (light beam) through which the customer has to pass the cart 90 such as between railings 102, 104 before placing on the cart 90 onto the scale 89 the scale as a reminder to not forget bulky items on the cart.

Also, to potentially reduce the likelihood of non-items being left in the cart, the "non-items" could be detected via imaging technologies, which may involve analyzing images of the shopping cart before weighing and sending a message to the customer or to the store clerk if a non-item is detected as remaining in the cart.

Alternatively, an imaging device may be used to recognize some selected items that are visible in the cart and reconcile the selected items being purchased by comparing items recognized by the imaging device with identified items on the purchase list (i.e., items identified by the POS system or portable data terminal), thus performing a partial audit such as by (a) using the imaging system to recognize some of the items in the container, and (b) determining whether the items recognized by the imaging system to items are on the purchase list. If non-items are detected by the store clerk, the imaging system, or other partial audit system, such information may be communicated to the customer (or store personnel) so that the non-item (or the recognized item determined not to be on the purchase list) may be removed from the cart.

Step 24: Calculating a "theoretical" weight of the cart plus items (Weight2). The store database contains identification information of items, including a weight for each item and uses this information to calculate the theoretical weight by adding (1) the weight of the cart and (2) the sum of the weights of all items that have been identified and are anticipated as being in the cart.

Step 26: Performing a security check or risk assessment by comparing the Weight1 (total weight of the items in the cart plus cart weight as weighed on the scale in Step 22) to Weight2 (the theoretical weight as calculated in Step 24).

Step 28: Determining whether a security audit is required. If "No" proceed to Step 30 and if "Yes" proceed to Step 34. A security audit may be indicated depending solely on the weight comparison or in combination with one or more other factors, such as customer's past audit/shopping history, an analysis of the items (an item analysis may be especially useful when the expected error due to some lightweight items is significant, which may occur in actual use, e.g., a lightweight toothbrush). As another example, non-regular customers might more likely be required to undergo the audit (i.e., have a greater risk indication) while regular/frequent customers (such as customers signed up with a store affinity account) might not.

Step 30: Determining if the result of the weight comparison is acceptable. An acceptable variation/difference between the theoretical item and the actual item weight may be based on various factors such as: total number of items, type of items, time of day, the length queue lines, the customer's past audit/shopping history, or other factors. If "Yes" proceed to Step 32 and if "No" proceed to Step 34. Alternatively, the checkout software could skip the weight check if "unknown items" are detected as present in the shopping list and the total weight is higher than the theoretical weight. If the total weight with "unknown items" is lower than the theoretical weight, a rescan may still be performed.

Step 32: Determining if an audit should be performed by usual audit rules. If "Yes" proceed to Step 34, and if "No" proceed to Step 36.

Step 34: Performing an audit on the transaction. For example, a store clerk may perform a manual check on the items in the transaction, performing a visual comparison of the items in the cart to the purchase list of items identified (at Step 20) as having been placed in the cart, or rescanning all the items in the cart at a standard checkout station, or rescanning all the items in the cart using a portable data terminal or other method.

Step 36: Completing checkout with payment by the customer.

When a customer purchases items sold by quantity (e.g., a watermelon that may vary significantly in weight), or by weight (such as other fruit or vegetables) the customer may be invited to remove those items from the cart before placing the cart on the weigh scale. Such items may be handled manually by a store clerk, or by another suitable process.

As an alternative, the system may skip the weight check if these by quantity or by weight types of items are present in the shopping list and the total weight is higher that the theoretical weight. If the total weight with these types of items is lower than the theoretical weight a rescan can still be performed.

As an alternative, the average weight of one piece of the item may be stored in the software database and used to determine the weight of the item. The number of pieces of the item may be calculated from the item price.

The process may include steps to manage an item with variable weight due to different packaging (e.g., Acme Fabric Softener with/without the baby bear). The weights of the different variants of these type of items are stored in the database. The software may be configured to use for each item the minimum weight, the maximum weight, or an intermediate weight in the cart weight check procedure, depending on the degree of restrictiveness of the security checks that the retailer wants to apply.

The system may manage variable weight items, such as fruit/vegetables scale bags, by obtaining the weight of these items using various information sources:

The weight of a variable weight item can be included in the code printed by the scale station (such as Produce Scale Station 65 in FIG. 1), for example on an adhesive label to be applied on the item, and thus the weight could became available to the self-shopping system when the optical code on the item label is read with the portable terminal.

The self-shopping system can ask the weight of the weighted items to the scales system.

The self-shopping system can search in the system database for the information related to a variable weight item and can combine them with the data read on the item label from the customer with the portable terminal.

The self-shopping system can ask for information related to the weight of a variable weight item to the POS system.

The store database may manage the update of the weight data because sometimes the weights are reset as a result of too many errors (alarms) at the checkout. In this case the software may use the weight available before the reset until the new weight is available. In some cases, the weight of the items may be obtained from the self-checkout stations of the store, whereby the items are weighed by the scales included in the self-checkout stations. It may happen that the weight of an item is considered no longer valid, and therefore is reset, because of too many errors found during weighing operations at the checkout stations and a new weight must be entered into the system for that item. In this case, the self-shopping system can continue to operate using the "old" weight of that item until the new/revised weight is available.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention.

What is claimed:

1. A method for item self-checkout at a retail store in a shopping transaction, comprising:

obtaining a tare weight for a shopping container without items for the shopping container selected for use by the customer;

identifying, using a data reader, one or more items selected for purchase and placed in the shopping container by the customer;

adding the items to a purchase list responsive to the identifying performed by the data reader;

measuring a total weight of the shopping container and the items therein using a scale at a checkout position of a self-checkout terminal after all items have been selected and placed into the shopping container;

calculating a measured total weight of the items using the tare weight for the shopping container and the measured total weight of the shopping container and the items therein as obtained from the scale;

calculating a theoretical total weight of the items equal to a sum of expected weights of the items added to the purchase list;

identifying, via an imaging system, at least some of the one or more items in the shopping container;

determining, via the imaging system, whether each of the one or more items identified by the imaging system corresponds to an item on the purchase list;

approving a checkout process if the measured total weight of the items is equal to the theoretical total weight of the items within a given tolerance and each of the one or more items identified by the imaging system corresponds to an item on the purchase list;

initiating an alert for the checkout process if the measured total weight of the items is not equal to the theoretical total weight of the items within the given tolerance or an item identified by the imaging system does not correspond to an item on the purchase list; and completing the checkout process after the approval and responsive to payment input by the customer through a payment portal of the self-checkout terminal.

2. The method of claim 1 wherein obtaining the tare weight for the shopping container without items comprises weighing the shopping container prior to the customer placing items in the shopping container.

3. The method of claim 1 wherein identifying, using the data reader, the one or more items selected for purchase comprises reading an optical code on the respective items.

4. A method according to claim 1 further comprising:
identifying, via the imaging system, one or more non-items in the shopping container; and
notifying the customer to remove the one or more non-items from the shopping container either prior or during the step of using the scale to obtain the measured total weight of the shopping container and the items therein.

5. A method according to claim 1 wherein obtaining the tare weight for the shopping container without items comprises:
identifying the shopping container; and
obtaining the associated tare weight for the identified shopping container as selected from a store database containing weights corresponding to each of the shopping containers used at the store.

6. A method according to claim 5 wherein identifying the shopping container comprises using the data reader to read an optical code on the shopping container.

7. A self-checkout system for a store, comprising
an item database containing weight information for items in the store;
a data reader configured to identify items selected by the customer and placed into a shopping container at the store;
an imaging system configured to identify at least some of the items selected by the customer and placed into the shopping container; and
a scale at a checkout position and configured to weigh the shopping container containing the items selected by the customer and placed in the shopping container, and to determine a measured total weight of the shopping container and the items therein, wherein the system is configured to:
calculate a theoretical weight of the items equal to a sum of expected weights of items placed in the shopping container, as obtained from the item database;
compare the theoretical weight calculated for the items identified and placed in the shopping container to the measured total weight of the items responsive to obtaining a tare weight associated with the shopping container;

determine whether each of the items identified by the imaging system correspond to an item identified by the data reader;
approve a transaction if the measured total weight of the items is equal to the theoretical total weight of the items within a given tolerance and each of the items identified by the imaging system correspond to an item identified by the data reader;
initiate an alert for the transaction if the measured total weight of the items is not equal to the theoretical total weight of the items within the given tolerance or an item identified by the imaging system does not correspond to an item identified by the data reader; and
complete the checkout process for the transaction after the approval and responsive to payment input by the customer through a payment portal of the self-checkout terminal.

8. The self-checkout system of claim 7, wherein the shopping container is selected from the group consisting of a shopping cart, a shopping basket, a shopping trolley, and a shopping bag.

9. The self-checkout system of claim 7, wherein the database further includes shopping container weight information for the tare weight associated with the shopping containers in the store, and the system is further comprising retrieving the tare weight associated with the individual shopping container selected by the customer from the shopping container.

10. The self-checkout system of claim 9, wherein the system is further configured to associate the individual shopping container to its corresponding weight information in the database responsive to an optical code disposed on the shopping container being decoded.

11. The self-checkout system of claim 9, wherein the system is further configured to associate the individual shopping container to its corresponding weight information in the database responsive to an electronic tag disposed on the shopping container being detected.

12. The self-checkout system of claim 7, wherein the system is further configured to adjust a risk factor for initiating a security audit based on the weight comparison and at least one additional factor.

13. The self-checkout system of claim 12, wherein the security audit is further based on the specific customer's known shopping history with the store.

14. The self-checkout system of claim 13, wherein the customer's known shopping history includes prior security audit results.

15. The self-checkout system of claim 13, wherein the customer's known shopping history includes membership status in a store affinity program.

16. The self-checkout system of claim 7, wherein the given tolerance of variation between the measured total weight of the items and the theoretical total weight is variable depending one or more factors associated with the transaction.

17. The self-checkout system of claim 16, wherein the one or more factors contributing to varying the given tolerance includes a total number of items added to the purchase list.

18. The self-checkout system of claim 16, wherein the one or more factors contributing to varying the given tolerance includes a length of queue line waiting for checkout.

19. The self-checkout system of claim 16, wherein the one or more factors contributing to varying the given tolerance includes the customer's known shopping history.

* * * * *